US011812346B2

(12) United States Patent
Taft et al.

(10) Patent No.: US 11,812,346 B2
(45) Date of Patent: Nov. 7, 2023

(54) SYSTEM AND METHOD FOR CONTROLLING AND MANAGING INTEGRATED ACCESS AND BACKHAUL

(71) Applicant: Verizon Patent and Licensing Inc., Basking Ridge, NJ (US)

(72) Inventors: David Taft, Keller, TX (US); Muralidhar Devarakonda, Edison, NJ (US); Mark T. Watts, Newport, RI (US); Kalyani Bogineni, Irving, TX (US); Jerry Steben, Fort Worth, TX (US); Maqbool Chauhan, Keller, TX (US); Julian Jimenez, Wesley Chapel, FL (US); Kristen Sydney Young, Mine Hill, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 63 days.

(21) Appl. No.: 17/199,996

(22) Filed: Mar. 12, 2021

(65) Prior Publication Data

US 2022/0295242 A1  Sep. 15, 2022

(51) Int. Cl.
*H04W 40/12* (2009.01)
*H04W 4/18* (2009.01)
*H04W 40/22* (2009.01)
*H04W 88/14* (2009.01)
*H04W 40/24* (2009.01)

(52) U.S. Cl.
CPC ............ *H04W 4/18* (2013.01); *H04W 40/22* (2013.01); *H04W 40/248* (2013.01); *H04W 88/14* (2013.01)

(58) Field of Classification Search
CPC ..... H04W 20/22; H04W 28/10; H04W 48/18; H04W 92/14; H04W 92/20; H04W 76/12; H04W 72/0453; H04W 48/16; H04W 16/26; H04W 84/047; H04W 40/12; H04W 40/22; H04W 72/04; H04L 45/74
USPC .................................................. 370/328, 329
See application file for complete search history.

(56) References Cited

U.S. PATENT DOCUMENTS

| 10,827,544 | B1* | 11/2020 | Yau ...................... H04W 76/12 |
| 11,178,708 | B2* | 11/2021 | Yau ...................... H04W 40/34 |
| 11,252,635 | B2* | 2/2022 | Hong ................. H04B 7/15542 |
| 11,477,808 | B2* | 10/2022 | Ramamurthi ......... H04W 40/22 |
| 11,510,131 | B2* | 11/2022 | Zhu ...................... H04W 40/24 |
| 11,528,661 | B1* | 12/2022 | Akl ...................... H04W 40/10 |
| 11,589,288 | B2* | 2/2023 | Akl ...................... H04W 40/24 |
| 2021/0051512 | A1* | 2/2021 | Hampel ................ H04W 80/06 |

(Continued)

OTHER PUBLICATIONS

Technical Specification: 5G; NG-RAN; Architecture description (3GPP TS 38.401 version 15.4.0 Release 15). ETSI TS 138 401 V15.4.0 (Apr. 2019). 41 pages.

*Primary Examiner* — Man U Phan

(57) ABSTRACT

A network device may receive Network Slice Selection Assistance Information (NSSAI) and network information from network components and from a set of Integrated Access and Backhaul (IAB) nodes; generate descriptions of, or updates to the descriptions of, routing paths based on the NSSAI and the network information; and send the descriptions or the updates to the IAB nodes. The routing paths may include one or more backhaul links between the IAB nodes, and the descriptions and the updates associate each of the routing paths with one or more Single-NSSAIs (S-NSSAIs).

20 Claims, 7 Drawing Sheets

(56) References Cited

U.S. PATENT DOCUMENTS

| | | | |
|---|---|---|---|
| 2021/0250749 A1* | 8/2021 | Cheng | H04W 12/0471 |
| 2021/0314856 A1* | 10/2021 | Huang | H04W 88/14 |
| 2021/0345218 A1* | 11/2021 | Tsuda | H04W 92/14 |
| 2021/0400560 A1* | 12/2021 | Wu | H04W 40/32 |
| 2022/0039189 A1* | 2/2022 | Wu | H04W 74/0833 |
| 2022/0124548 A1* | 4/2022 | Srivastava | H04W 40/248 |
| 2022/0141890 A1* | 5/2022 | Miao | H04W 40/22 |
| | | | 370/329 |
| 2022/0141894 A1* | 5/2022 | Akl | H04W 40/22 |
| | | | 370/329 |
| 2022/0141898 A1* | 5/2022 | Kim | H04W 76/14 |
| | | | 370/315 |
| 2022/0159676 A1* | 5/2022 | Wei | H04W 72/23 |
| 2022/0174579 A1* | 6/2022 | Zhuo | H04W 40/02 |
| 2022/0210698 A1* | 6/2022 | Ly | H04W 40/22 |
| 2022/0217613 A1* | 7/2022 | Teyeb | H04L 45/74 |
| 2022/0272564 A1* | 8/2022 | Teyeb | H04W 84/047 |
| 2022/0272774 A1* | 8/2022 | Teyeb | H04W 28/0268 |
| 2022/0287051 A1* | 9/2022 | Panchal | H04W 72/23 |
| 2022/0303209 A1* | 9/2022 | Zou | H04W 40/04 |
| 2023/0022723 A1* | 1/2023 | Akkarakaran | H04W 88/14 |
| 2023/0051495 A1* | 2/2023 | Yang | H04W 72/1273 |

\* cited by examiner

SYSTEM AND METHOD FOR CONTROLLING AND MANAGING INTEGRATED ACCESS AND BACKHAUL

BACKGROUND INFORMATION

A radio access network (RAN) is one portion of a telecommunication system. A RAN allows wireless communication devices, such as mobile phones, to connect to the system over radio frequency (RF) links. The system can render different types of telecommunication services to the mobile devices over RANs.

RANs may now include self-organizing network (SON) components. These SON components are coupled to other network components in RANs, such as a base station, for example, to modify antenna beam widths, or to apply various other optimization techniques. RANs may also include Integrated Access and Backhaul (IAB) nodes. An IAB node has the functionality of a base station but may also connect to other elements of the RAN over wireless links as well as cables, wires, or optical fibers.

DETAILED DESCRIPTION OF PREFERRED EMBODIMENTS

The following detailed description refers to the accompanying drawings. The same reference numbers in different drawings may identify the same or similar elements.

The systems and methods described herein relate generally to selecting network paths for traffic between mobile devices and the service provider network (also "provider network") to which the mobile devices are wirelessly attached. More particularly, embodiments described herein relate to selecting network paths from among a number of potential paths through Integrated Access and Backhaul (IAB) nodes. For some mobile devices that are attached to the provider network, such optimization may reduce service latency reduce bandwidth loading, and balance data flow. Selections of particular paths may be based on network information, including telemetry information associated with network traffic.

A typical base station provides a point-of-attachment for User Equipment ("UE") e.g., mobile devices (also "mobile terminals" (MTs)), that are to receive communication services from a provider network. During operation, the base station establishes wireless links (e.g., Radio Frequency (RF) links) with the mobile devices. The base station may be connected to the provider network by backhaul paths, and therefore, any signals and data sent from/to the mobile terminals to/from the provider network pass through the backhaul path.

Like the base station, an IAB node may provide a point-of-attachment to mobile devices. However, in contrast to the base station, the IAB node may have wireless or a wireline backhaul links to the provider network. That is, for the IAB node, both its access function (for the mobile device/terminal) and the backhaul function may be integrated into its wireless communication capabilities. An IAB node may operate in any frequency band, e.g., New Radio (NR), while its access link may be either in-band (i.e., in the same frequency band as the backhaul link) or out-of-band (i.e., in different frequency bands as the backhaul ink).

Figure 1:
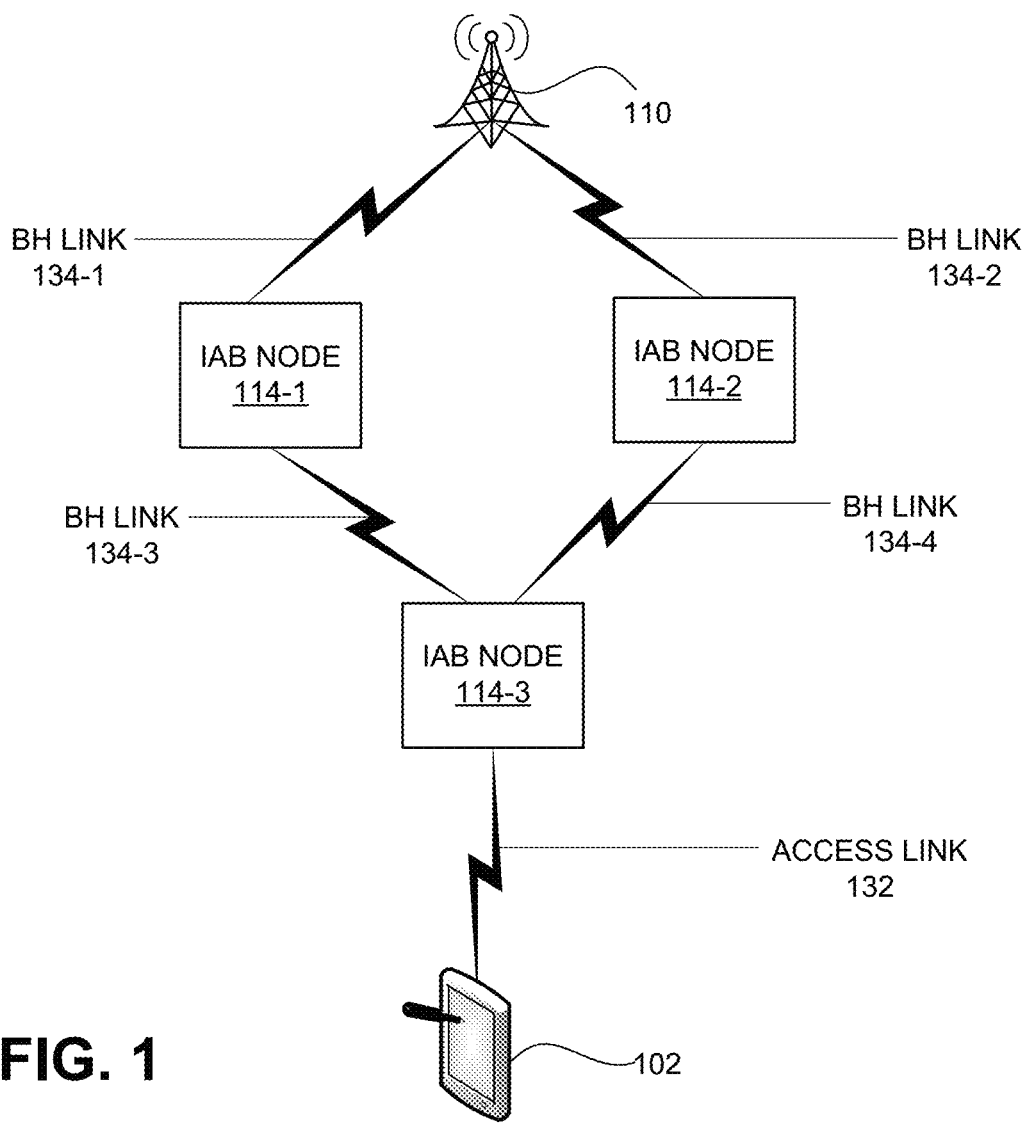
FIG. 1 illustrates the concepts described herein.

FIG. 1 illustrates the concepts described herein. As shown, a portion of network includes a base station 110 (also referred to as wireless station 110), IAB nodes 114-1 through 114-3, and a mobile terminal 102. In FIG. 1, base station 110 has established links 134-1 and 134-2, respectively, with IAB nodes 114-1 and 114-2, and IAB nodes 114-1 and 114-2 have established communication links 134-3 and 134-4 with IAB node 114-4. Communication links between IAB nodes 114 are herein referred to as backhaul (BH) links. Mobile terminal 102 is wirelessly attached to IAB node 114-4 thorough access link 132. The number of IAB nodes, backhaul links, access links, and mobile terminals is exemplary, and in an actual implementation, may be different from those illustrated in FIG. 1. Furthermore, although base station 110 and IAB nodes 114-1 through 114-4 may include both wireless and wireline links, they are not illustrated for simplicity.

Assume that a service provider wishes to allow mobile devices or terminals, such as mobile terminal 102 (also herein referred to as User Equipment (UE) 102), to establish a communication path with base station 110, to receive communication services. However, as shown, mobile terminal 102 can establish a link with base station 110 through two possible paths: either through IAB nodes 114-3 and 114-1, backhaul links 134-3 and 134-1, and access link 132; or through IAB nodes 114-3 and 114-2, backhaul links 134-4 and 134-2, and access link 132. The system as described herein evaluates different possible paths between mobile terminal 102 and base station 110 based on network information, including telemetry information. The system then selects the optimal path for mobile terminal 102 and routes traffic to/from mobile terminal 102 through the selected path. The information for selecting the paths may include, for example, a Network Slice Selection Assistance Information (NSSAI) or Single-NSSAIs (S-NSSAIs), and Per Flow Descriptors (PFD), and network telemetry information, such as link latencies, link traffic, jitter, error rates, etc.

Figure 2:
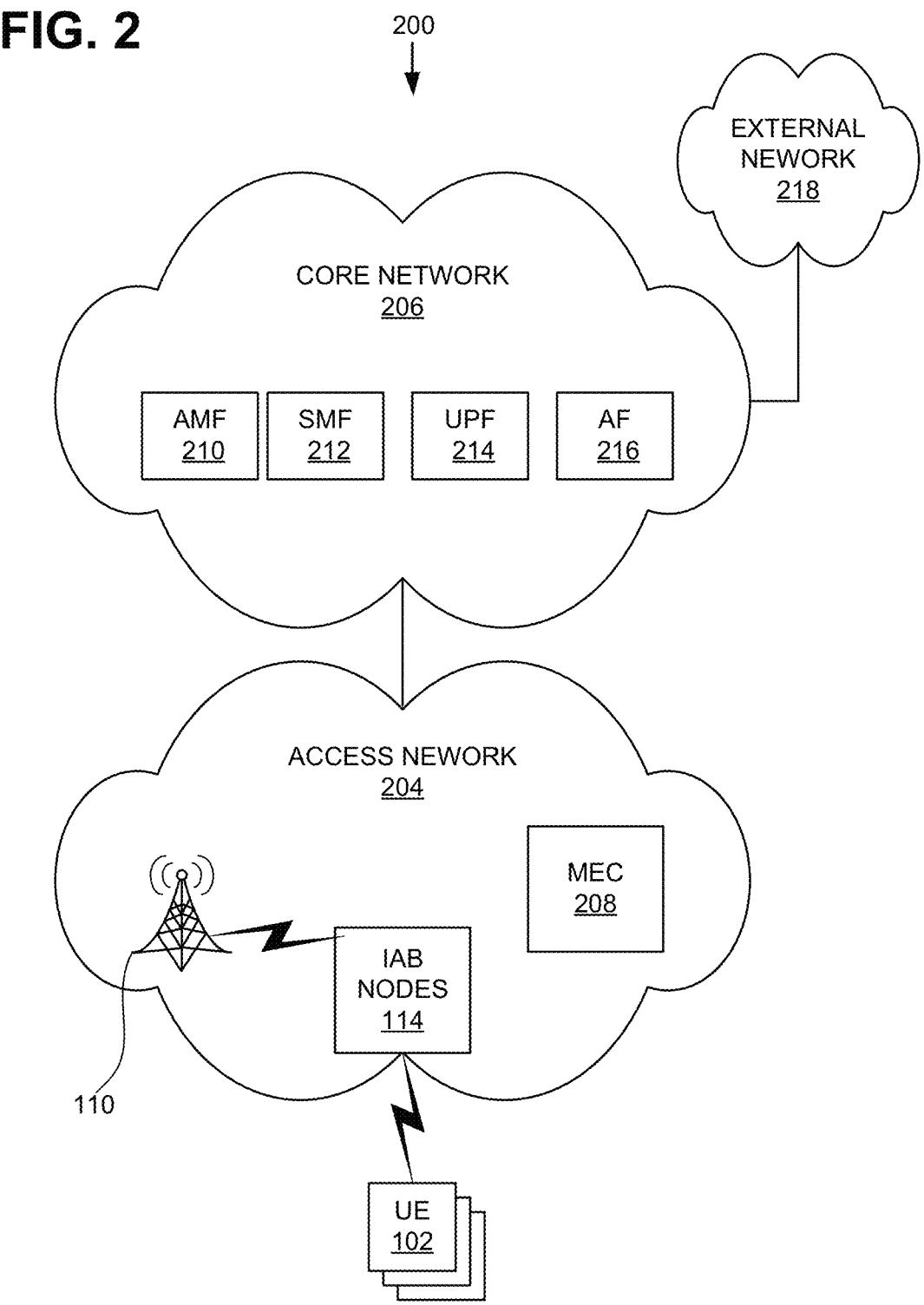
FIG. 2 illustrates exemplary network environment in which the systems and methods described herein may be implemented.

FIG. 2 illustrates an exemplary network environment 200 in which the systems and methods described herein may be implemented. As shown, environment 200 may include User Equipment device (UE) 102 (also MT 102, UEs 102, or MTs 102), an access network 204, a core network 206, and an external network 218.

UE 102 may include a wireless communication device and/or a mobile terminal. Examples of UE 102 include: a smart phone; a tablet device; a wearable computer device (e.g., a smart watch); a laptop computer; a portable gaming system; and an Internet-of-Thing (IoT) device. In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1a) devices and Narrow Band (NB)-IoT devices. UE 102 may send packets over or to access network 204.

In one implementation, UE 102 may include a program that receives services from one or more devices in networks 204, 206, and/or 218. Depending on the service, UE 102 may require low latency or ultra-low latency communication. For example, UE 102 may have subscribed to the network services to receive high priority traffic treatment. Such services may require access networks 204, for example, to route the traffic to the local computing resources with minimal latency.

Access network 204 may allow UE 102 to access core network 206. To do so, access network 204 may establish and maintain, with participation from UE 102, an over-the-air channel with UE 102; and maintain backhaul channels with core network 206. Access network 204 may convey information through these channels, from UE 102 to core network 206 and vice versa.

Access network 204 may include an LTE radio network, a Fifth Generation (5G) radio network and/or another advanced radio network. These radio networks may include many wireless stations and IAB nodes. In FIG. 2, these are depicted as a wireless stations 110 (earlier referred to as base station 110) and TAB nodes 114. Wireless station 110 and TAB nodes 114 may establish and maintain an over-the-air channel with UE 102 and backhaul channels with core network 206.

Wireless station 110 may include a Fourth Generation (4G), 5G, or another type of wireless station (e.g., evolved Node B (eNB), next generation Node B (gNB), etc.) that includes one or more RF transceivers. In FIG. 2, wireless station 110 is depicted as having a backhaul wireless link with TAB nodes 114. A wireless station 110 that is attached to an TAB node via a backhaul link is herein referred to as IAB donor 110. As used herein, the term "IAB donor" refers to a specific type of TAB node.

According to one implementation, IAB donor 110 may include a service orchestrator (SO) (also referred to as an intelligent controller). In some implementations, the service orchestrator may implement several policies for optimizing IAB node operation. For example, the service orchestrator may act as a router with respect to IAB nodes 114. In particular, IAB donor 110 may include a service orchestrator that generates a routing information base (RIB) and a forwarding information base (FIB) that map different paths to IAB nodes 114. The service orchestrator in IAB donor 110 may forward its routing information to IAB nodes 114. Additionally, in possession of IAB routing information, IAB donor 110 may a select a particular IAB path, among different possible paths, to UE 102. For example, IAB donor 110 may select the path with the least latency. As mentioned above, the SO may make the selection based on telemetry information, such as link delay, traffic volume, PFD, jitter, error rate, etc. The SO is described further below with reference to FIG. 4.

IAB nodes 114 may include one or more devices to relay signals from IAB donor 110 to UE 102 and from UE 102 to IAB donor 110. An IAB node 114 may have an access link with UE 102, and have a wireless and/or wireline backhaul link to other IAB nodes 114 and/or IAB donor 110. Like IAB donor 110, an IAB node 114 may have the capability to operate as a router, for exchanging routing information with IAB donor 110 and other IAB nodes 114 and for selecting traffic paths.

As further shown, access network 204 may include Multi-Access Edge Computing (MEC) clusters 208. MEC clusters 208 may be located geographically close to wireless stations 110, and therefore, close to UEs 102 serviced by access network 204 via wireless stations 110. Due to its proximity to UEs 102, MEC cluster 208 may be capable of providing services to UEs 102 with minimal latency. Depending on the implementations, MEC clusters 208 may provide many core functions at network edges. In other implementations, MEC clusters 208 may be positioned at other locations (e.g., in core network 206) at which MEC clusters 208 can provide computational resources for improved performance.

Core network 206 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 206 may allow the delivery of Internet Protocol (IP) services to UE 102, and may interface with other networks, such as external network 218.

Depending on the implementation, core network 206 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Function (AMF), a Session Management Function (SMF), a Unified Data Management (UDM) function, a Network Slice Selection Function (NSSF), a Policy Control Function (PCF), etc.), or another type of core network components. In FIG. 2, core network 206 is illustrated as including AMF 210, SMF 212, UPF 214, and AF 216, which are 5G core network components. Although core network 206 may include other 5G core network components, 4G core network components, or another type of core network components, they are not illustrated in FIG. 2 for simplicity.

AMF 210 may perform registration management, connection management, reachability management, mobility management, lawful intercepts, Short Message Service (SMS) transport for UE 102, session management messages transport between UE 102 and SMF 212, access authentication and authorization, and location services management. AMF 210 may provide the functionality to support non-3GPP access networks, and/or other types of processes.

SMF 212 may perform session establishment, session modification, and/or session release, perform Dynamic Host Configuration Protocol (DHCP) functions, perform selection and control of UPF 214, configure traffic steering at UPF 214 to guide the traffic to the correct destinations, terminate interfaces toward a Policy Control Function (PCF), perform lawful intercepts, charge data collection, support charging interfaces, control and coordinate charging data collection, terminate session management parts of Non-Access Stratum messages, perform downlink data notification, manage roaming functionality, and/or perform other types of control plane processes for managing user plane data.

UPF 214 may maintain an anchor point for intra/inter-Radio Access Technology (RAT) mobility, maintain an external Packet Data Unit (PDU) point of interconnect to a particular packet data network, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNB), and/or perform other types of user plane processes.

AF 216 may provide services associated with a particular application, such as, for example, an application for influencing traffic routing, an application for accessing a Network Exposure Function (NEF), an application for interacting with a policy framework for policy control, a third-party application running on a server device in a particular packet data network, and/or other types of applications.

External network 218 may include networks that are external to core network 206. In some implementations, external network 218 may include packet data networks, such as an Internet Protocol (IP) network.

In FIG. 2, MEC clusters 208, AMF, 210, SMF, 212, UPF 214, and/or AF 216 may provide network information to IAB donor 110. The information may include NSSAI, S-NSSAIs, Per Flow Data (PFD), and/or telemetry information, such as packet error rates, traffic volume, jitter, delay, latency per link, etc. As mentioned above, a service orchestrator within wireless station 110 may use the information to create or update routing tables and/or to select optimal network paths within IAB nodes 114 for UEs 102 connected to core network 206 via access network 204.

For simplicity, FIG. 2 does not show all components that may be included in network environment 200 (e.g., routers, bridges, wireless access point, additional networks, additional UEs 102, etc.). For example, FIG. 2 does not show devices or components which collect traffic-related data from MEC clusters 208 that are coupled to wireless stations 110. That is, depending on the implementation, network environment 200 may include additional, fewer, different, or a different arrangement of components than those illustrated in FIG. 2.

Figure 3:
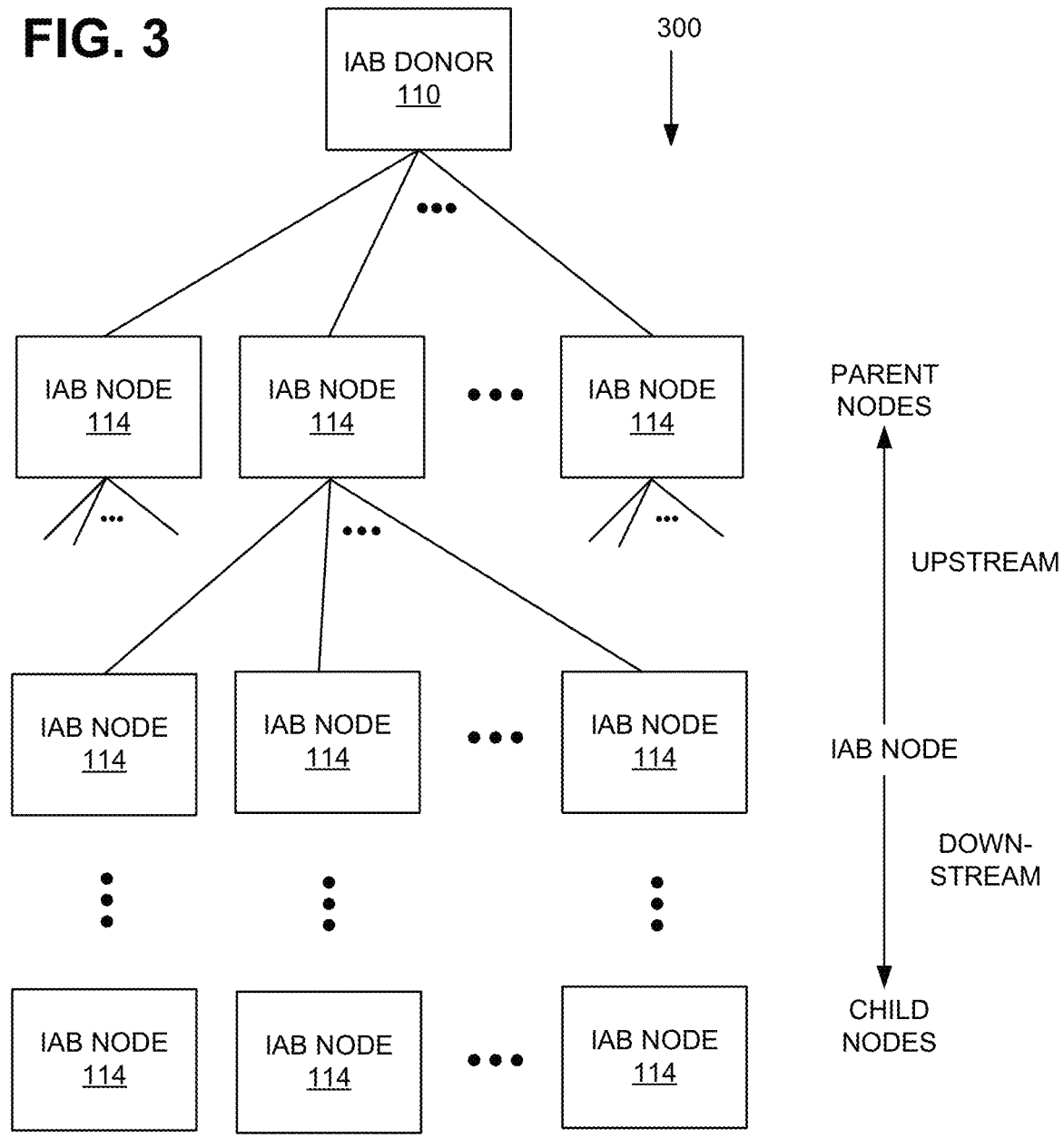
FIG. 3 illustrates an exemplary network layout of IAB nodes according to an implementation.

FIG. 3 illustrates an exemplary network layout 300 of IAB nodes 114 according to one implementation. As shown, some IAB nodes 114 may be attached to IAB donor 110 and to other IAB nodes 114 through backhaul links, which may be either wireline (cables or optical fibers) or wireless. Each IAB node 114 may have a parent node upstream (e.g., either a parent IAB node 114 or IAB donor 110) and a child node downstream (e.g., either a UE 102 or a child IAB node 114). An IAB node 114 that has no child IAB node 114 is herein referred to as a leaf IAB node 114.

The number of hops from one IAB node 114 to reach IAB donor 110 through one communication path may be same or different from the number of hops from another IAB node 114 to reach IAB donor 110 through another communication path. Furthermore, for each IAB node 114, there may be one or more paths to IAB donor 110. UE 102 may establish an access link with any of IAB nodes 114 and not just leaf IAB nodes 114.

Figure 4:
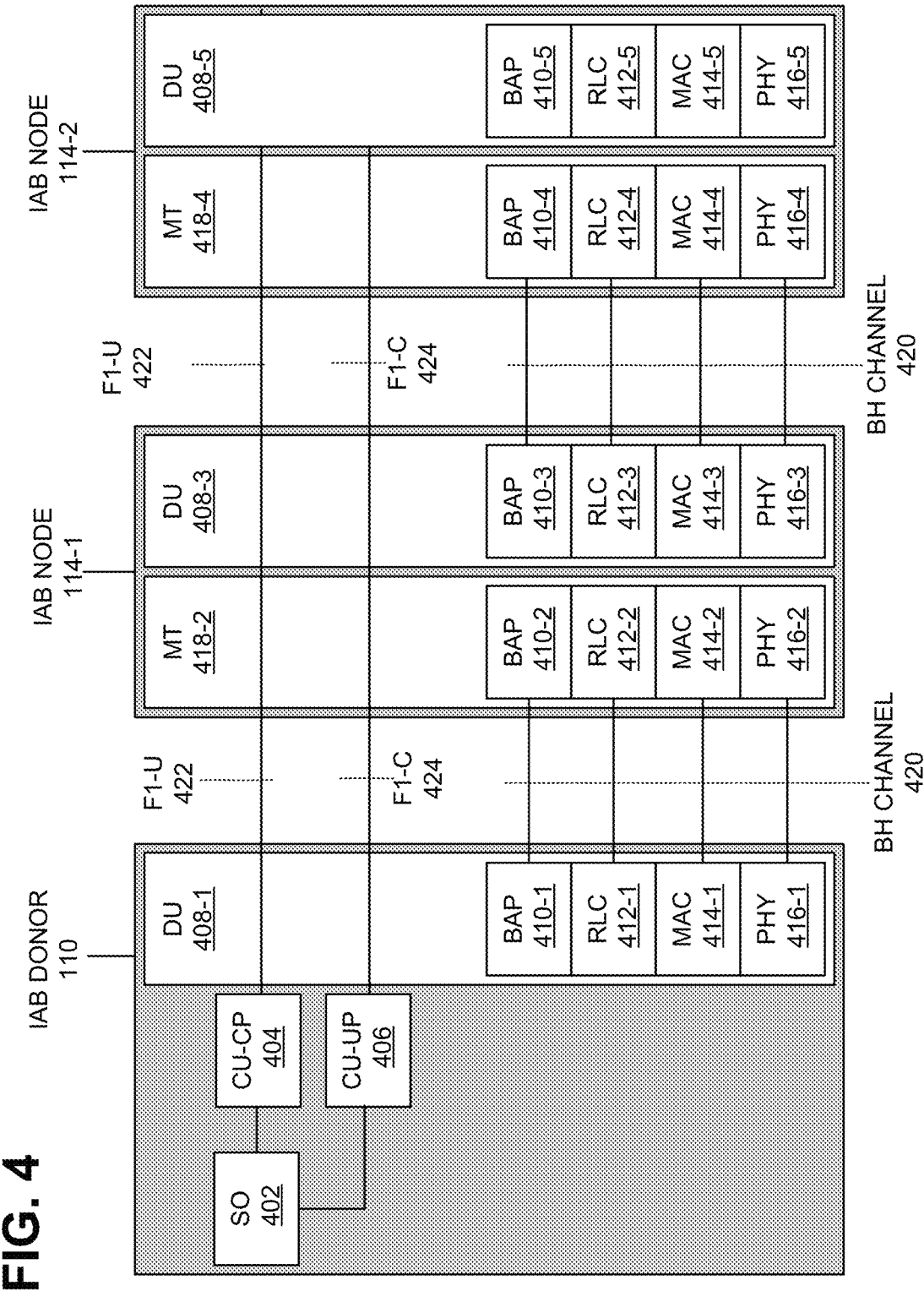
FIG. 4 illustrates exemplary functional components of the IAB nodes and the IAB donor of FIGS. 2 and 3, according to an implementation.

FIG. 4 illustrates exemplary functional components of IAB donor 110 and IAB nodes 114 in FIGS. 1-3. Although only a single IAB node 114-1 is shown to be between IAB node 114-2 and IAB donor 110, in other embodiments, there may be many IAB nodes 114 between an IAB node 114 and IAB donor 110. Furthermore, although, FIG. 4 shows only a single path from the IAB node 114-2 to IAB donor 110, there may be one or more paths from each IAB node 114 to IAB donor 110.

As shown, IAB donor 110 may include a Service Orchestrator 402, a Central Unit-Control Plane (CU-CP) 404, a CU-User Plane (CU-UP) 406, and a Distributed Unit (DU) 408-1. IAB node 114-1 may include a mobile terminal (MT) 418-2 and a DU 408-3, and IAB node 114-2 may include MT 418-4 and DU 408-5. MTs 418-2 and 418-4 have some of the capabilities of UE/MT 102. Communication protocol stacks for DUs 408 and MTs 418 are shown for IAB donor 110, IAB node 114-1, and IAB node 114-2. Although IAB donor 110, IAB node 114-1, and IAB node 114-2 may include additional or fewer components, for simplicity, they are not illustrated in FIG. 4.

SO 402 may implement policies for managing and controlling IAB nodes 114. For implementing policies, SO 402 may receive network information and telemetry information from IAB nodes 114 and other components in access network 204, core network 206, and external network 218. The information may include NSSAI, S-NSSAIs, link delays (e.g., delays between two IAB nodes 114, Per Flow Descriptors (e.g., data for each flow from an application hosted at MEC cluster 208), jitter, error rate, etc. SO 402 may collect the information from various network components, such as AMF 210, SMF 212, UPF 214, AF 216, MEC clusters 208, applications in networks 204, 206, and 218, etc.

In addition, SO 402 may receive routing related information from IAB nodes 114 and build routing tables based on the information. For example, SO 402 may construct Routing Information Bases (RIBs) and Forwarding Information Bases (FIBs) based on the information. The RIBs and FIBs may include possible paths from particular IAB nodes 114 to IAB donor 10.

Depending on the policies, SO 402 may generate paths differently. For example, in some embodiments, SO 402 may support policies for prioritizing paths to/from particular network slices. In such cases, SO 402 may create or make updates to the RIB and the FIB that list network slice-dependent paths. Alternatively, SO 402 may support policies for prioritizing paths with minimal latencies. SO 402 may use telemetry information that SO 402 receives from each IAB node 114 and other network components to indicate link costs in the tables. For example, SO 402 may indicate that a particular link between two IAB nodes 114 has a high resource cost, due to delay/latency.

Once SO 402 has constructed the routing tables (e.g., RIB and FIB), SO 402 may push the routing tables to IAB nodes 114. Each IAB node 114 may keep its own routing/forwarding table, to perform its own routing/forwarding. To push the routing tables to IAB nodes 114, SO 402 may cause CU-CP 404 to initiate F1 Application Protocol (AP) procedures to configure DU 408-1 with the mapping from IP addresses to Backhaul Adaptation Protocol (BAP) Identifiers (IDs). Furthermore, CU-CP 404 may propagate the updates to other IAB nodes 114 through the F1AP procedure.

After the routing information is updated at the IAB nodes 114, the IAB nodes 114 may route the packets from UEs 102 that attach to the IAB nodes 114. When an IAB node 114 determines that there are multiple forwarding paths from a UE 102 to IAB donor 110, the IAB node 114 may select a particular path from the candidate paths based on the information and data from UE 102 (e.g., service-related information, such as an application identifier), S-NSSAI, the address of the application to which the UE 102 wishes to attach, etc.

In some implementations, IAB node 114 to which the UE 102 attaches may have the ability to send an upstream request to SO 402 for an optimal path. When the IAB node 114 does send such a request, SO 402 may determine, an optimal path for the UE 102 based on the current telemetry information and the service-related information included in the request. After selecting the optimal paths, SO 402 may forward the selection information to the requesting IAB node 114.

CU-CP 404 may perform control plane signaling associated with managing DUs 408 (e.g., DUs 408-1, DU 408-3, and DU 408-5) over F1-C interface. CU-CP 404 may signal to DUs 408 over a control plane communication protocol stack that includes, for example, F1AP (e.g., the signaling protocol for F1 interface between a CU and a DU), a Stream Control Transmission Protocol (SCTP), and an IP. DU 408-3 and 408-5 in IAB nodes 114-1 and 114-2 may include corresponding stacks to handle/respond to the signaling (not shown).

CU-UP 406 may perform user plane functions associated with managing DUs 408 (e.g., DU 408-1, 408-3, and 408-5) over F1-U interface. CU-UP 406 may interact with DUs 408 over a user plane communication protocol stack that includes, for example, General Packet Radio Service Tunneling Protocol (GTP)-User plane, the User Datagram Protocol (UDP), and the IP. DU 408-3 and 408-5 in IAB nodes 114-1 and 114-2 would have corresponding stacks to handle/respond to messages from CU-UP 406 (not shown).

Although CU-CP 404 and CU-UP 406 (collectively referred to as a CU) and DU 408-1 are depicted as part of IAB donor 110 in FIG. 4, in many implementations, the CU does not need to be physically located near DU 408-1, and may be implemented as cloud computing elements, through network function virtualization (NFV) capabilities of the cloud. The CU may communicate with the components of core network 106 through S1/NG interfaces and with other CUs through X2/Xn interfaces.

DUs 408 may provide support for one or more cells covered by radio beams at the antennas of IAB donor 110 and/or IAB nodes 114. DUs 408 may handle UE mobility, from a DU to a DU, gNB to gNB, cell to cell, beam to beam, etc. As noted above, DUs 408 communicate with a CU through an F1 interface (e.g., F1-U 422 and F1-C 424). In FIG. 4, the control plane connections from CU-CP 404 and CU-UP 406 are shown as terminating at the DU 408-5 in IAB node 114-2. However, for the path between IAB donor 110 and IAB node 114-1, CU-CP 404 and CU-UP 406 would terminate their connections at the DU 408-3 in IAB node 114-1, although not shown in FIG. 4.

Each of MTs 418-2 and 418-4 permits its host device to act like a mobile terminal (e.g., UE 102). For example, to DU 408-1 in IAB donor 110, MT 418-2 in IAB node 114-1 behaves similarly as a mobile terminal attached to DU 408-3. The relationship between MT 418-2 and DU 408-1, and between MT 408-4 and DU 408-3, is established over a Backhaul (BH) channel 420 between DU 408-1 of IAB donor 110 and MT 418-2 of IAB node 114-1 and BH channel 421 between DU 408-3 of IAB node 114-1 and MT 418-4 of IAB node 114-2.

Each of BH channels 420 and 421 in FIG. 4 includes multiple network layers that include, for example, a Backhaul Adaptation Layer (BAP) 410 (BAP 410-1 through BAP 410-4, a Radio Link Control (RLC) 412 (RLC 412-1 through RLC 412-4), Media Access Control (MAC) 414 (MAC 414-1 through MAC 414-4), and a Physical layer (PHY) 416 (PHY 416-1 through PHY 416-4). BAP 410 packages data and sends them from one IAB node 114 (e.g., IAB node 114-2) to IAB donor 110. RLC 412 receives upper layer packet data units (PDUs), groups them for different transport channels, and transfers them to peer RLC 412 over lower layers. MAC 414 maps the RLC 412 to physical layer data/signals.

MAC 414 multiplexes and de-multiplexes logical channels, prioritizes the channels, handles hybrid automatic repeat request, and deals with random access control. In addition, MAC 414 manages the data as MAC PDUs, and schedules them for transmission over PHY 416. The result of scheduling has the effect of pre-committing, at PHY 416, blocks of frequency ranges and time intervals to be used for transmission of particular signals/data. These blocks of frequency-ranges and time intervals are herein referred to as physical resource bocks (PRBs). That is, scheduling reserves specific PRBs for particular transmissions at specified times. PRBs are components of what is referred to as radio frames that contain physical signals.

Figure 5:
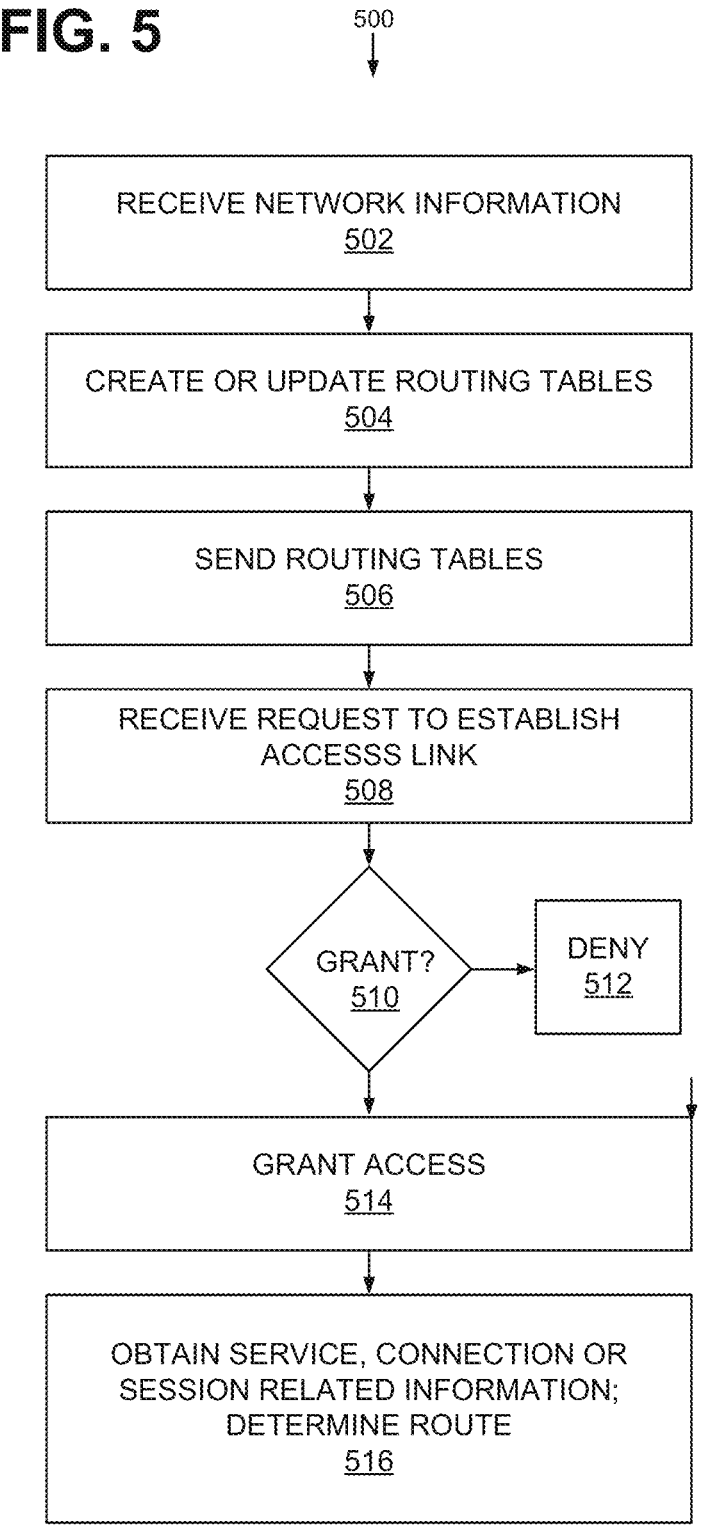
FIG. 5 is a flow diagram of an exemplary process that is associated with managing and controlling IAB nodes, according to an implementation; p
Figure 6:
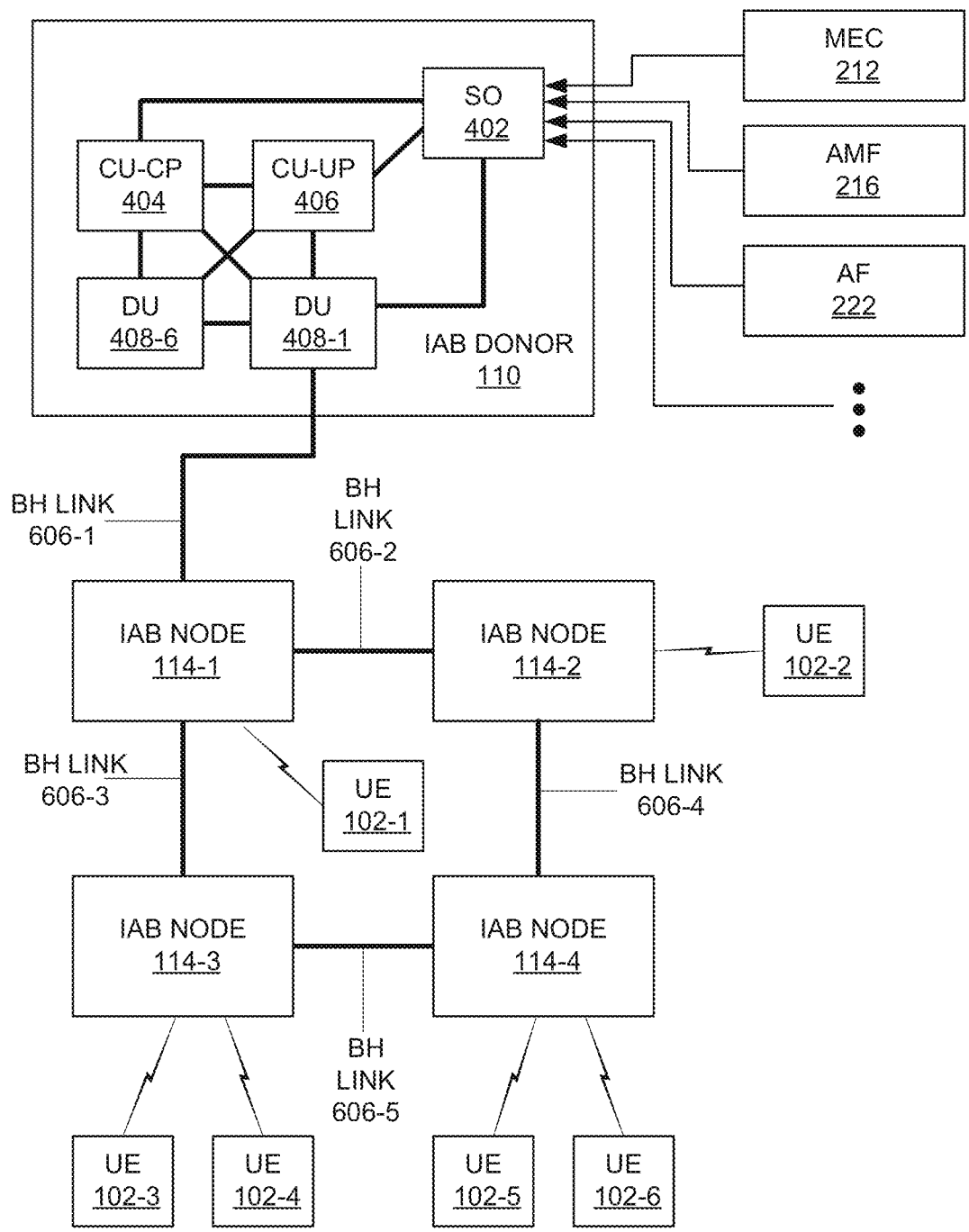
FIG. 6 depicts exemplary configurations of IAB nodes during the process of FIG. 5, according to an implementation.

FIG. 5 is a flow diagram of an exemplary process that is associated with managing and controlling IAB nodes, according to one implementation. FIG. 6 depicts exemplary configurations of IAB nodes during the process of FIG. 5. Process 500 may be performed by one or more of network components and devices, such as IAB donor 110, UEs 102, IAB nodes 114, core network components (e.g., AMF 210, SMF 212, UPF 214, etc.), etc. Assume that, in FIG. 6, IAB donor 110 and IAB nodes 114 (i.e., IAB nodes 114-1, 114-2, 114-3 and 114-4 in FIG. 6) have established backhaul links 606-1 through 606-5 with one another. Each of backhaul links 606 may comprise a cable, an RF link, or an optical cable. In addition, assume that UEs 102-1 through 102-6 have either attached or are about to attach to IAB nodes 114 through access links during process 500 at different times.

As shown in FIG. 5, process 500 may include IAB donor 110 receiving network information (block 502) from various network components. The information may include telemetry information (e.g., link delays, jitter, error rates, traffic volume, PFDs, etc.) and other network information (e.g., bandwidth, NSSAI, S-NSSAIs, etc.). FIG. 6 illustrates SO 402 in IAB donor 110 receiving such information from IAB nodes 114, MEC cluster 208, AMF 210, AF 216, and/or other network components.

Process 500 may further include IAB donor 110 creating or updating routing tables (block 504), such as a RIB, a FIB, etc. In one implementation, paths listed in the routing tables may be network slice dependent (e.g., different paths exist for nodes on different network slices). In addition, the routing tables may account for costs, e.g. resource, physical, etc., that are associated with link latencies, traffic volume to/from particular applications (e.g., an application in MEC cluster 208, AF 216, etc.), bandwidths, etc. SO 402 may construct or update such tables using the information, which includes NSSAI, S-NSSAIs, PFDs, network telemetry information (e.g., delays between IAB nodes 114, error rates, jitter, etc.). SO 402 may create or update the routing tables in particular ways depending on policies that SO 402 implements. SO 402 may create or update the tables at certain time intervals or when there are significant changes in network traffic patterns (e.g., BH link failures).

Process 500 may include IAB donor 110 sending the routing tables or the updates to IAB nodes 114 (block 506). For example, in FIG. 6, to push the routing tables to IAB nodes 114, SO 402 in IAB donor 110 may cause CU-CP 404 within IAB donor 110 to initiate F1AP procedures to configure the DU 408-1 within IAB donor 110. This may allow IAB nodes 110 to map IP addresses to BAP IDs. Furthermore, IAB donor 110 may propagate the updates to other IAB nodes 114-1 through 114-4 via the F1AP procedure.

Process 500 may further include receiving, at an IAB node 114, a request to establish an access link from UE 102 (block 508). For example, in FIG. 6, IAB node 114-3 receives a request to establish an access link from UE 102-4. Upon receipt of an access request, an IAB node 114 may determine whether the request can be granted, based on its access control procedures (block 510). The access control procedures may include authentication or evaluation its current IAB node 114 usage condition (e.g., whether the IAB node 114 can handle another connection). If the request cannot be granted (block 510: NO). IAB node 114 may deny the access request (block 512: NO).

If the access can be granted (block 510: YES), IAB node 114 may grant access (block 514). IAB node 114 may then obtain service, connection, or session related information from UE 102 (block 516). The service related information may include, for example, the address of the target application and/or the S-NSSAI related to the service that the UE 102 is to receive. Subsequently, IAB node 114 node may determine an appropriate route based on the information (block 516).

Continuing with the preceding example, referring to FIG. 6, suppose IAB node 114-3 has obtained the connection related information and S-NSSAI from UE 102-4. Further assume that, the routing tables at IAB node 114-3 indicates that there are two possible data paths for UE 102-4 to IAB donor 110: a first path through BH links 606-5, 606-4, 606-2, and 606-1 associated with a first S-NSSAI; and a second path through BH links 606-3 and 606-1 associated with a second S-NSSAI. IAB node 114-3 compares the S-NSSAI from the UE 102-4 to the S-NSSAIs of the two paths, and when IAB node 114-3 determines that the S-NSSAI of the second path matches the S-NSSAI of UE 102-4, IAB node 114-3 selects the second path.

In a different example, IAB node 114-3 may use information other than S-NSSAI from UE 102-4, such as a latency requirement for the service requested by UE 102-4. Similar to the preceding example, suppose that there are two paths to IAB donor 110 from IAB node 114-3: a first path through links 606-5, 606-4, 606-2, and 606-1 associated with a first latency; and a second path through links 606-3 and 606-1 associated with a second latency. Also, suppose that both paths are associated with the same S-NSSAI. In this example, in addition to comparing the S-NSSAI from UE 102-4 to the S-NSSAIs of the two paths, IAB node 114-3 may compare the latency requirement of the requested service from UE 102-4 with the latencies of the two links. IAB node 114-3 may then select the path which best meets the required latency requirement.

In the preceding examples, IAB node 114-3 used S-NSSAIs and latencies to select one of the two possible paths, in other implementations and use case scenarios, an IAB node 114 may use other parameters, such as the QoS required by UE 102 and QoSs supported by different paths; current link usage (e.g., traffic through the links); path failure rates; and/or any other parameter that may affect the link preferences.

In a different implementation, the IAB node 114 may send a message to SO 402 in IAB donor 110, requesting IAB donor 110 to provide IAB node 114 with information needed to make the path selection. For example, suppose the routing tables at IAB node 114-3 indicate that the two possible paths discussed above are available for UE 102; BH link 606-2 has failed; and SO 402 in IAB donor 110 is aware of the broken link. When IAB node 114 requests IAB donor 110 for information to make a selection, IAB donor 110 may indicate that BH link 606-2 is not available and/or that the second path should be selected. After IAB node 114-3 makes the selection, UE 102 may access the service through the selected path.

Figure 7:
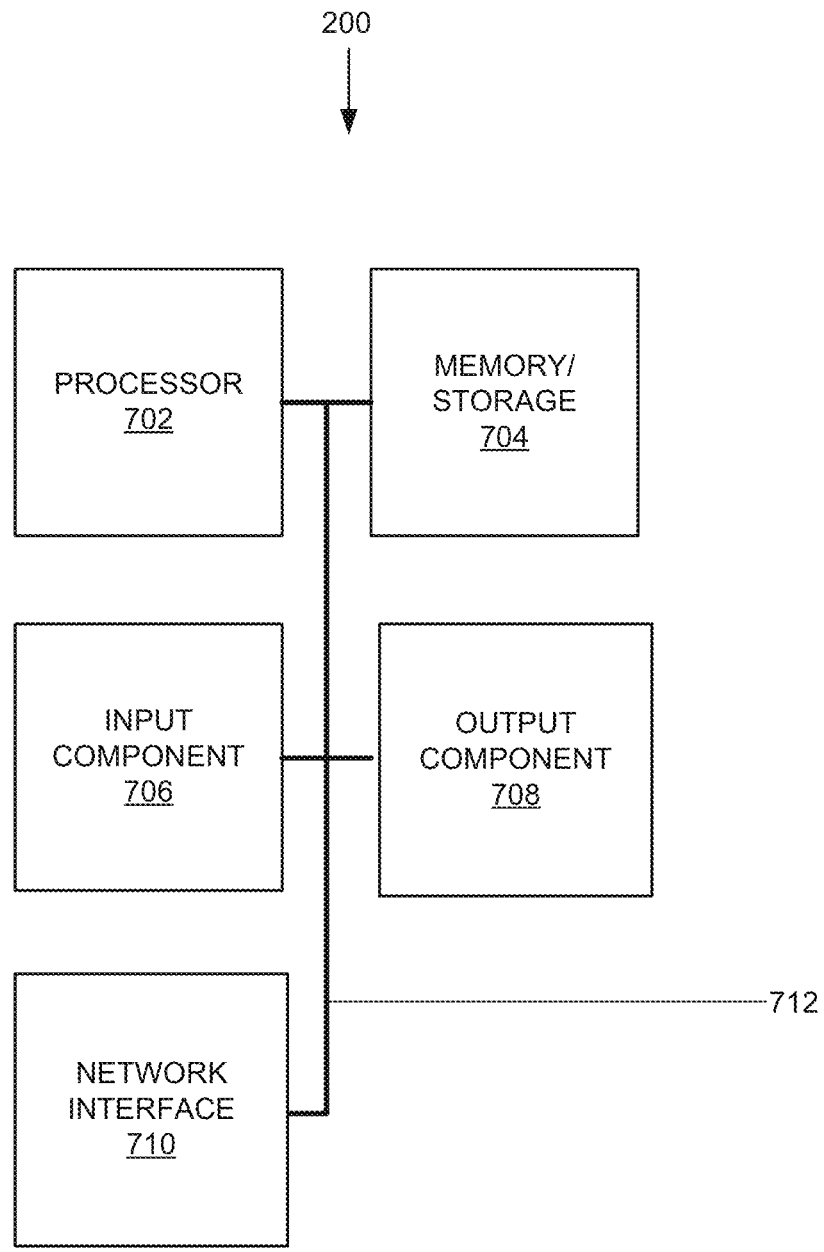
FIG. 7 depicts exemplary components of an exemplary network device, according to an implementation.

FIG. 7 depicts exemplary components of an exemplary network device 700. Network device 700 corresponds to or is included in UE 102, IAB nodes 114, and any of the network components of FIGS. 1-4 and 6 (e.g., a router, a network switch, servers, gateways, wireless stations 110, IMEC cluster 208, etc.). As shown, network device 700 includes a processor 702, memory/storage 704, input component 706, output component 708, network interface 710, and communication path 712. In different implementations, network device 700 may include additional, fewer, different, or a different arrangement of components than the ones illustrated in FIG. 7. For example, network device 700 may include a display, network card, etc.

Processor 702 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 700 and/or executing programs/instructions.

Memory/storage 704 may include static memory, such as read only memory (ROM), and/or dynamic memory, such as random access memory (RAM), or onboard cache, for storing data and machine-readable instructions (e.g., programs, scripts, etc.).

Memory/storage 704 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 704 may be external to and/or removable from network device 700. Memory/storage 704 may include, for example, a Universal Serial Bus (USB) memory stick, a dongle, a hard disk, off-line storage, a Blu-Ray® disk (BD), etc. Memory/storage 704 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 706 and output component 708 may provide input and output from/to a user to/from network device 700. Input and output components 706 and 708 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 700.

Network interface 710 may include a transceiver (e.g., a transmitter and a receiver) for network device 700 to communicate with other devices and/or systems. For example, via network interface 710, network device 700 may communicate with wireless station 110.

Network interface 710 may include an Ethernet interface to a LAN, and/or an interface/connection for connecting network device 700 to other devices (e.g., a Bluetooth interface). For example, network interface 710 may include a wireless modem for modulation and demodulation.

Communication path 712 may enable components of network device 700 to communicate with one another.

Network device 700 may perform the operations described herein in response to processor 702 executing software instructions stored in a non-transient computer-readable medium, such as memory/storage 704. The software instructions may be read into memory/storage 704 from another computer-readable medium or from another device via network interface 710. The software instructions stored in memory or storage (e.g., memory/storage 704, when executed by processor 702, may cause processor 702 to perform processes that are described herein. For example, UE 102, IAB donor 110, and IAB nodes 114 may each include various programs for performing some of the above-described functions for reducing latency.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks have been described above with regard to the processes illustrated in FIG. 5, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A network device comprising:
a processor to:
receive Network Slice Selection Assistance Information (NSSAI) from network components and network information from a set of Integrated Access and Backhaul (IAB) nodes and the network components;
generate, by using the NSSAI and the network information, a routing table or a forwarding table that lists routing paths between the IAB nodes; and
send information included in the routing table or the forwarding table to the set of IAB nodes,
wherein the network components are different from the IAB nodes, and
wherein at least one of the set of IAB nodes is to:
receive a request from a mobile terminal to access a network service;
obtain a Single-NSSAI (S-NSSAI) from the mobile terminal; and
select a routing path, among the routing paths, from the at least one of the set of IAB nodes to the network device based on the S-NSSAI.

2. The network device of claim 1, wherein the network information includes at least latency values for:
the one or more backhaul links between the set of IAB nodes; or
the set of IAB nodes.

3. The network device of claim 1, wherein when sending the information, the processor causes a Central Unit-Control Plane (CU-CP) to initiate Application Protocol (AP) procedures to configure a Distributed Unit (DU), with a mapping from Internet Protocol (IP) addresses to Backhaul Adaptation Protocol (BAP) Identifiers (IDs).

4. The network device of claim 1, wherein the processor is further to:
receive a request from a first IAB node, among the set of IAB nodes, to select a routing path, among the routing paths;
select a first routing path, among the routing paths, based on the network information; and
send a message to the first IAB node, wherein the message indicates the selected first routing path.

5. The network device of claim 4, wherein the routing paths include at least one failed routing path, and the first routing path is not the least one failed routing path.

6. The network device of claim 1, wherein the routing table or the forwarding table indicates latencies for the routing paths, and wherein the at least one of the set of IAB nodes is configured to:
when selecting the routing path based on the S-NSSAI, select the routing path also based on the latencies for the routing paths.

7. The network device of claim 1, wherein the network components include:
a Multi-Access Edge Computer (MEC) cluster and the network information includes Per Flow Descriptors (PFDs) from the MEC cluster.

8. A method comprising:
receiving, by a network device, Network Slice Selection Assistance Information (NSSAI) from network components and network information from a set of Integrated Access and Backhaul (IAB) nodes and the network components;
generating, by the network device and by using the NSSAI and the network information, a routing table or a forwarding table that lists routing paths between the IAB nodes; and
sending, by the network device, information included in the routing table or the forwarding table to the set of IAB nodes,
wherein the network components are different from the IAB nodes, and
wherein at least one of the IAB nodes is to:

receive a request from a mobile terminal to access a network service;

obtain a Single-NSSAI (S-NSSAI) from the mobile terminal; and select a routing path, among the routing paths, from the at least one of the set of IAB nodes to the network device based on the S-NSSAI.

9. The method of claim 8, wherein the network information includes at least latency values for:

the one or more backhaul links between the set of IAB nodes; or the set of IAB nodes.

10. The method of claim 8, wherein sending the information includes:

causing a Central Unit-Control Plane (CU-CP) to initiate Application Protocol (AP) procedures to configure a Distributed Unit (DU), with a mapping from Internet Protocol (IP) addresses to Backhaul Adaptation Protocol (BAP) Identifiers (IDs).

11. The method of claim 8, further comprising:

receiving a request from a first IAB node, among the set of IAB nodes, to select a routing path, among the routing paths;

selecting a first routing path, among the routing paths, based on the network information; and sending a message to the first IAB node, wherein the message indicates the selected first routing path.

12. The method of claim 11, wherein the routing paths include at least one failed routing path, and the first routing path is not the least one failed routing path.

13. The method of claim 8, wherein the routing table or the forwarding table indicates latencies for the routing paths, and wherein the at least one of the set of IAB nodes is configured to:

when selecting the routing path based on the S-NSSAI, select the routing path also based on the latencies for the routing paths.

14. The method of claim 8, wherein the network components include:

a Multi-Access Edge Computer (MEC) cluster and the network information includes Per Flow Descriptors (PFDs) from the MEC cluster.

15. A non-transitory computer-readable medium comprising computer executable instructions, which, when executed by a processor included in a network device, cause the processor to:

receive Network Slice Selection Assistance Information (NSSAI) from network components and network information from a set of Integrated Access and Backhaul (IAB) nodes and the network components;

generate, by using the NSSAI and the network information, a routing table or a forwarding table that lists routing paths between the IAB nodes; and send information included in the routing table or the forwarding table to the set of IAB nodes, wherein the network components are different from the IAB nodes, and wherein at least one of the IAB nodes is to:

receive a request from a mobile terminal to access a network service;

obtain a Single-NSSAI (S-NSSAI) from the mobile terminal; and select a routing path, among the routing paths, from the at least one of the set of IAB nodes to the network device based on the S-NSSAI.

16. The non-transitory computer-readable medium of claim 15, wherein the network information includes at least latency values for:

the one or more backhaul links between the set of IAB nodes; or the IAB nodes.

17. The non-transitory computer-readable medium of claim 15, wherein when sending the information, the processor causes a Central Unit-Control Plane (CU-CP) to initiate Application Protocol (AP) procedures to configure a Distributed Unit (DU), with a mapping from Internet Protocol (IP) addresses to Backhaul Adaptation Protocol (BAP) Identifiers (IDs).

18. The non-transitory computer-readable medium of claim 15, wherein when the computer executables instructions are executed by the processor, the instructions further cause the processor to:

receive a request from a first IAB node, among the set of IAB nodes, to select a routing path, among the routing paths;

select a first routing path, among the routing paths, based on the network information; and send a message to the first IAB node, wherein the message indicates the selected first routing path.

19. The non-transitory computer-readable medium of claim 18, wherein the routing paths include at least one failed routing path, and the first routing path is not the least one failed routing path.

20. The non-transitory computer-readable medium of claim 15, wherein the routing table or the forwarding table indicates latencies for the routing paths, and wherein the at least one of the set of IAB nodes is configured to:

when selecting the routing path based on the S-NSSAI, select the routing path also based on the latencies for the routing paths.

* * * * *